(12) United States Patent
Oyobe et al.

(10) Patent No.: US 8,786,238 B2
(45) Date of Patent: Jul. 22, 2014

(54) DRIVE SYSTEM FOR ROTATING ELECTRIC MACHINE

(75) Inventors: Hichirosai Oyobe, Nagoya (JP); Shinjiro Ashida, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 99 days.

(21) Appl. No.: 13/558,130

(22) Filed: Jul. 25, 2012

(65) Prior Publication Data

US 2013/0049665 A1 Feb. 28, 2013

(30) Foreign Application Priority Data

Aug. 22, 2011 (JP) ................................. 2011-180441

(51) Int. Cl.
*H02P 3/00* (2006.01)
*H02P 7/00* (2006.01)

(52) U.S. Cl.
USPC ........ 318/489; 318/376; 318/440; 318/400.3; 307/10.1

(58) Field of Classification Search
USPC ......... 318/440, 376, 494, 489, 400.3, 400.27; 307/10.1; 363/50; 180/65.275, 279
See application file for complete search history.

(56) References Cited

U.S. PATENT DOCUMENTS

| | | | | |
|---|---|---|---|---|
| 7,511,459 B2 * | 3/2009 | Holliday | ........................ | 322/24 |
| 7,690,458 B2 * | 4/2010 | Ueda | ........................... | 180/65.31 |
| 8,016,367 B2 * | 9/2011 | Hirata | ........................... | 303/151 |
| 8,054,012 B2 * | 11/2011 | Matsubara et al. | ............ | 318/139 |
| 8,415,825 B2 * | 4/2013 | Hirose | ........................... | 307/9.1 |
| 8,441,224 B2 * | 5/2013 | Sumi et al. | ..................... | 318/801 |
| 8,446,113 B2 * | 5/2013 | Welchko et al. | .............. | 318/376 |
| 8,446,116 B2 * | 5/2013 | Fukuta et al. | ............ | 318/400.27 |
| 8,502,412 B2 * | 8/2013 | Ang et al. | ...................... | 307/10.1 |
| 2007/0023215 A1 * | 2/2007 | Ueda | ............................. | 180/167 |
| 2007/0228822 A1 * | 10/2007 | Hirata | ........................... | 303/151 |
| 2008/0122408 A1 * | 5/2008 | Keiter et al. | ..................... | 322/28 |
| 2008/0303289 A1 * | 12/2008 | Holliday | ....................... | 290/4 R |
| 2008/0309095 A1 * | 12/2008 | Keiter et al. | ................. | 290/40 R |
| 2009/0091281 A1 * | 4/2009 | Matsubara et al. | ........... | 318/440 |
| 2010/0200377 A1 * | 8/2010 | Arakawa | ................ | 200/61.58 R |
| 2010/0213904 A1 * | 8/2010 | Yamada | ........................ | 320/166 |
| 2010/0214055 A1 * | 8/2010 | Fuji et al. | ........................ | 340/3.1 |
| 2011/0050136 A1 * | 3/2011 | Sumi et al. | .................. | 318/400.3 |
| 2011/0221370 A1 * | 9/2011 | Fukuta et al. | ............ | 318/400.27 |

(Continued)

FOREIGN PATENT DOCUMENTS

| | | |
|---|---|---|
| JP | 2005-020952 A | 1/2005 |
| JP | 2005-094883 A | 4/2005 |

(Continued)

*Primary Examiner* — Paul Ip
(74) *Attorney, Agent, or Firm* — Gifford, Krass, Sprinkle, Anderson & Citkowski, P.C.

(57) ABSTRACT

A MG drive computer switches off system relays when a collision or a possibility of collision is detected. The computer also executes the revolution speed reduction control for reducing the revolution speed of a rotating electric machine and the discharge control for discharging a smoothing capacitor. In the revolution speed reduction control, the second control for switching on switching elements of three phases of an upper arm or lower arm of an inverter and switching off all other switching elements is performed when the revolution speed of the rotating electric machine is equal to or less than a second threshold. When the revolution speed is higher than the second threshold, the first control for switching on a switching element of one phase of the upper arm or lower arm and switching off other switching elements is performed.

4 Claims, 4 Drawing Sheets

(56) References Cited

U.S. PATENT DOCUMENTS

| | | | |
|---|---|---|---|
| 2011/0221374 A1* | 9/2011 | Maebara et al. | 318/494 |
| 2011/0241581 A1* | 10/2011 | Flock et al. | 318/400.3 |
| 2012/0039100 A1* | 2/2012 | Hirose | 363/50 |
| 2012/0055727 A1* | 3/2012 | Omiya et al. | 180/279 |
| 2012/0068532 A1* | 3/2012 | Tanabe et al. | 307/10.1 |
| 2012/0133204 A1* | 5/2012 | Ang et al. | 307/10.1 |
| 2012/0212160 A1* | 8/2012 | Shindo et al. | 318/139 |
| 2012/0309588 A1* | 12/2012 | Ashida et al. | 477/7 |
| 2012/0326638 A1* | 12/2012 | Kim | 318/379 |

FOREIGN PATENT DOCUMENTS

| | | |
|---|---|---|
| JP | 2006-020450 A | 1/2006 |
| JP | 2010-047083 A | 3/2010 |
| JP | 2012-110200 A | 6/2012 |
| WO | 2012/056284 A2 | 5/2012 |

* cited by examiner

DRIVE SYSTEM FOR ROTATING ELECTRIC MACHINE

CROSS REFERENCE TO RELATED APPLICATIONS

This application claims priority to Japanese Patent Application No. 2011-180441 filed on Aug. 22, 2011, which is incorporated herein by reference in its entirety including the specification, drawings and abstract.

BACKGROUND OF THE INVENTION

1. Field of the Invention

The invention relates to a drive system for a rotating electric machine which functions as a running drive source for a vehicle. More particularly, the invention relates to a discharge technique of a smoothing capacitor provided in a drive system.

2. Description of Related Art

Motor-driven vehicles having a rotating electric machine installed therein as a running drive source, for example, hybrid automobiles and electric automobiles are widely available. Such motor-driven vehicle is usually provided with an inverter supplying alternating current (AC) power to the rotating electric machine, a battery connected to the inverter and a smoothing capacitor that smoothes a voltage between the inverter terminals. In such a vehicle, it is desirable that the switching element of the inverter be switched and the electric charge of the smoothing capacitor be discharged in the event of vehicle collision. In order to ensure such a discharge, Japanese Patent Application Publication No. 2005-020952 (JP-2005-020952 A) discloses a technique of performing switching control of the inverter with the object of discharging the electric charge of the smoothing capacitor when a vehicle collision is predicted. With such a technique, the inverter can be driven to perform the discharge and therefore the electric charge of the capacitor can be reliably discharged before the drive circuit of the inverter is crushed by the collision.

However, the problem associated with such a technique is that where a rotating electric machine rotates when such a discharge treatment is performed, a back electromotive force is generated and the discharge becomes impossible or requires a significant time. In particular, when a drive shaft comes out as a result of vehicle collision or when the vehicle turns over, even if the vehicle stops, the motor continues rotating, thereby easily causing the aforementioned problem.

Japanese Patent Application Publication No. 2005-094883 (JP-2005-094883 A) and Japanese Patent Application Publication No. 2006-020450 (JP-2006-020450 A) disclose techniques of, upon detection of vehicle collision, switching off a switching element on the upper arm side of the inverter and switching on a switching element on the lower arm side, thereby generating a brake force for the vehicle, and then switching on all of the switching elements to discharge the electric charge remaining in the smoothing capacitor. By so generating a brake force and reducing the revolution speed of the rotating electric machine prior to the discharge, it is possible to reduce further the time from the collision to the completion of the discharge.

However, with the techniques described in JP-2005-094883 A and JP-2006-020450 A, the revolution speed of the rotating electric machine cannot be reduced efficiently. As a result, a significant time is required to the completion of the discharge even with the techniques described in JP-2005-094883 A and JP-2006-020450 A.

SUMMARY OF THE INVENTION

Accordingly, the invention provides a drive system for a rotating electric machine that makes it possible to discharge the smoothing capacitor faster.

A drive system for a rotating electric machine that functions as a running drive source for a vehicle according to an embodiment of the invention includes: a collision detection unit that detects a collision or a possibility of collision of the vehicle; an inverter that converts direct current power supplied from a direct current supply into alternating current power and outputs the alternating current power to the rotating electric machine; a smoothing capacitor that smoothes a voltage between terminals of the inverter; and a controller that performs a discharge control for controlling the inverter, wherein when the collision or possibility of collision is detected, the controller cuts off a power output from the direct current supply, performs a revolution speed reduction control for reducing a revolution speed of the rotating electric machine to a value equal to or less than a predetermined first threshold, and then discharges electric charges accumulated in the smoothing capacitor, and wherein the controller performs a first control for switching on a switching element of one arm among an upper arm and a lower arm of the inverter for only one phase and switching off all other switching elements when the revolution speed of the rotating electric machine exceeds a second threshold that is higher than the first threshold in the revolution speed reduction control.

The controller may perform a second control for switching off the switching elements of one arm among the upper arm and the lower arm of the inverter for all of the three phases and switching on the switching elements of the other arm for all of three phases when the revolution speed of the rotating electric machine is equal to or lower than the second threshold and higher than the first threshold in the revolution speed reduction control.

The second threshold is a revolution speed at which a drag torque generated by the first control is equal to a drag torque generated by the second control.

According to the embodiment of the invention, the first control is executed in a revolution speed region above the second threshold. Therefore, the revolution speed can be reduced faster and the time from the collision detection to the completion of the discharge can be further shortened.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
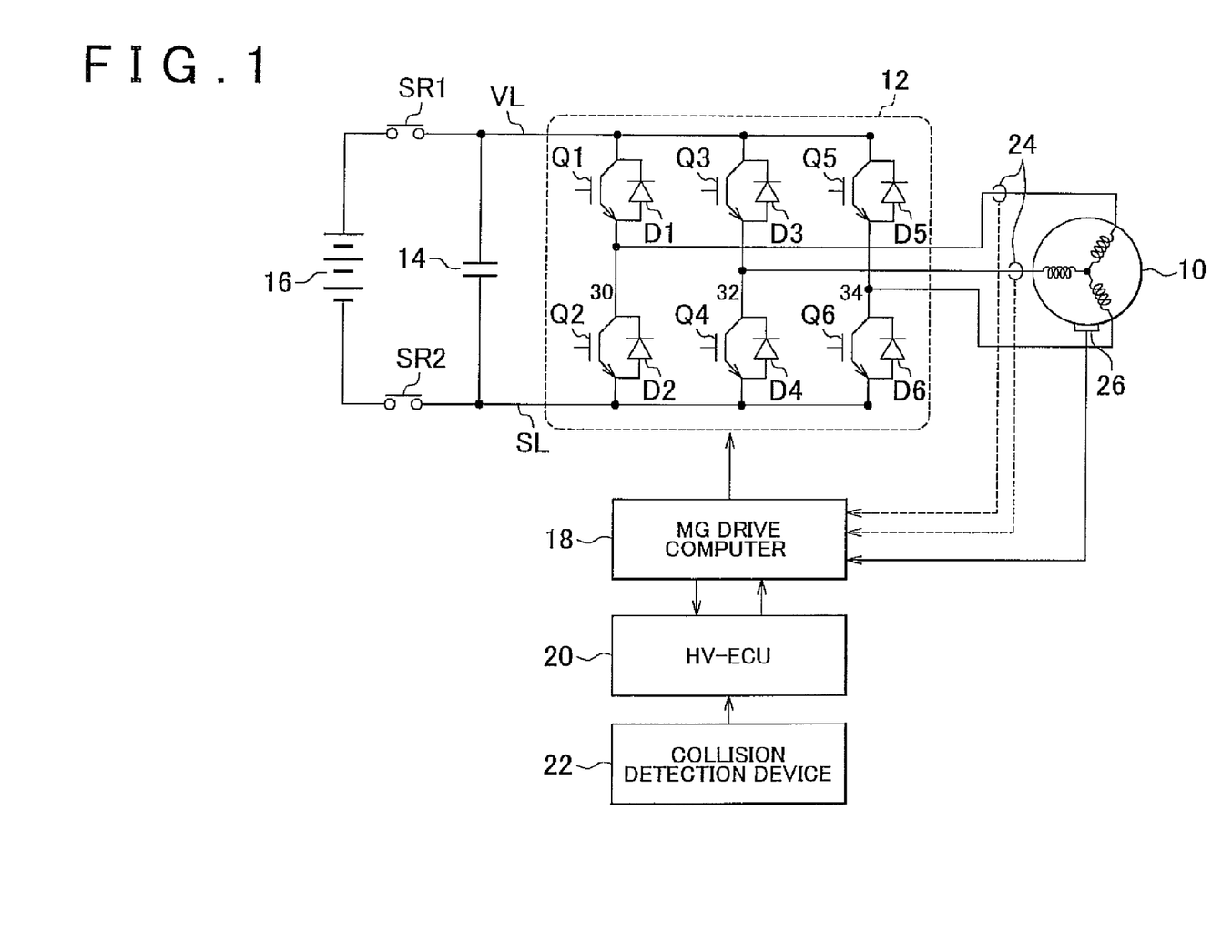
FIG. 1 illustrates the configuration of the drive system which is an embodiment of the invention.

An embodiment of the invention will be described below with reference to the appended drawings. FIG. 1 illustrates the configuration of the drive system for a rotating electric machine 10 which is an embodiment of the invention. This drive system is installed on a vehicle that carries the rotating electric machine 10 as a running drive source, for example, a hybrid automobile or an electric automobile, and controls the drive of the rotating electric machine 10.

The drive system is provided with a direct current (DC) supply 16, a smoothing capacitor 14, an inverter 12, a collision detection device 22, and a controller. The rotating electric machine 10 driven by the drive system functions as a motor that generates a torque for driving the drive wheels of the vehicle. The rotating electric machine 10 also functions as a generator that receives a rotating force from the drive wheels when the automobile is braked and generates regenerative power.

The DC supply 16 is configured to include a charge accumulating device (not shown in the figure) and outputs a DC voltage between a power supply line VL and a ground line SL. For example, the DC supply 16 can be configured to use a combination of a secondary battery and a buck-boost converter to convert the output voltage of the secondary battery and output a DC voltage to the power supply line VL and the ground line SL. In this case, the buck-boost converter is configured to be capable of bidirectional power conversion, so as to convert the DC voltage between the power supply line VL and the ground line SL into the charge voltage of the secondary battery.

A system relay SR1 is connected between the positive electrode of the DC supply 16 and the power supply line VL. A system relay SR2 is connected between the negative electrode of the DC supply 16 and the ground line SL. The system relays SR1 and SR2 are switched ON/OFF by a signal from a motor-generator (MG) drive computer 18. Further, the smoothing capacitor 14 is connected between the power supply line VL and the ground line SL.

The inverter 12 is constituted by a U-phase arm 30, a V-phase arm 32, and a W-phase arm 34. The U-phase arm 30, the V-phase arm 32, and the W-phase arm 34 are provided in parallel between the power supply line VL and the ground line SL.

The U-phase arm 30 is constituted by switching elements Q1 and Q2 connected in series. Likewise, the V-phase arm 32 is constituted by two switching elements Q3 and Q4 connected in series, and the W-phase arm 34 is constituted by two switching elements Q5 and Q6 connected in series. Further, diodes D1 to D6 that allow an electric current to flow from the emitter side to the collector side are connected between the collectors and emitters of the switching elements Q1 to Q6. For example, an insulated gate bipolar transistor (IGBT) is used as the switching element in the present embodiment. The switching elements Q1 to Q6 are ON/OFF controlled according to a switching control signal from the MG drive computer 18, that is, switching controlled. Among the plurality of switching elements Q1 to Q6, the switching elements Q1, Q3, and Q5, which are connected to the high-voltage side (plus terminal side) of a secondary battery constitute the upper arm (high-voltage arm) of the inverter 12, and the switching elements Q2, Q4, and Q6 connected to the low-voltage side (minus terminal side) of the secondary battery constitute the lower arm (low-voltage arm).

The intermediate points of phase arms are connected by conductive wires to phase terminals of phase coils of the rotating electric machine 10. Thus, the rotating electric machine 10 is a three-phase permanent magnet motor that is configured by connecting one end of each of the three (U, V, and W phases) coils to a common neutral point. The other end of the U-phase coil is connected by a conductive wire to the intermediate point of the IGBT elements Q1 and Q2, the other end of the V-phase coil is connected by a conductive wire to the intermediate point of the IGBT elements Q3 and Q4, and the other end of the W-phase coil is connected by a conductive wire to the intermediate point of the IGBT elements Q5 and Q6.

Current sensors 24 are introduced in the conductive wires of the U phase and V phase. The current sensors 24 measure the electric current flowing to the U phase and V phase of the rotating electric machine 10. The current values detected by the current sensors 24 are sent to the MG drive computer 18. Since the sum total of U-phase, V-phase, and W-phase motor currents Iu, Iv, and Iw (instantaneous values) is zero, the MG drive computer 18 calculates the W-phase motor current Iw from the U-phase and V-phase motor currents.

Further, a position sensor 26 that detects the rotation angle of a rotor (not shown in the figure) is also disposed in the rotating electric machine 10. The rotation angle detected by the position sensor 26 is sent to the MG drive computer 18.

The MG drive computer 18 together with the below-described hybrid vehicle electronic control unit (HV-ECU) 20 function as control means, perform ON/OFF control of the system relays SR1 and SR2, and perform switching control of the switching elements Q1 to Q6 of the inverter 12. The MG drive computer 18 receives a drive command for the rotating electric machine 10 from the HV-ECU 20. The drive command includes a drive allow/prohibit instruction for the rotating electric machine 10, a torque command value, and a revolution speed command. The MG drive computer 18 generates a switching control signal that controls the switching operation of the switching elements Q1 to Q6, so that the rotating electric machine 10 operates according to the drive command from the HV-ECU 20, by performing feedback control based on the detection values of the current sensors 24 and the position sensor 26.

For example, when a drive instruction for the rotating electric machine 10 is issued by the HV-ECU 20, the MG drive computer 18 generates a switching control signal such that a motor current corresponding to the torque command value of the rotating electric machine 10 is supplied. During the regenerative braking of the rotating electric machine 10, the MG drive computer 18 generates a switching control signal such that the AC voltage generated by the rotating electric machine 10 is converted into a DC voltage. Furthermore, when the HV-ECU 20 issues an instruction to discharge the smoothing capacitor 14, the MG drive computer 18 generates a switching control signal for switching off the system relays SR1 and SR2 and performing the discharge. Those signals will be described below in greater detail.

The HV-ECU 20 (Electronic Control Unit) calculates a drive allow/prohibit instruction for the rotating electric machine 10, a torque command value, and a revolution speed command according to the operation state of the vehicle, and outputs the calculation results to the MG drive computer 18. A collision detection signal from the collision detection device 22 is inputted to the HV-ECU 20. The collision detection device 22 is constituted by a radar sensor or a pre-crash sensor electronic control unit (ECU) installed on the vehicle. The radar sensor measures the collision speed of an obstacle (including other vehicles) and the vehicle (host vehicle) (that is, a relative speed of the obstacle and the host vehicle) and the distance between the obstacle and the host vehicle. For example, a milliwave radar for radar cruisers can be used as the radar sensor. The measurement signals are transmitted to the pre-crash sensor ECU, and the pre-crash sensor ECU determines the possibility of collision on the basis of the transmitted signals. Where a collision is possible, a collision detection signal is transmitted to the HV-ECU 20. Where the HV-ECU 20 receives the collision detection signal, the MG drive computer 18 is instructed to discharge the electric charges accumulated in the smoothing capacitor 14.

The control performed in the MG drive computer 18 during the discharge is explained below. As mentioned hereinabove, where the HV-ECU 20 receives a collision detection signal, the MG drive computer 18 is instructed to discharge the electric charges accumulated in the smoothing capacitor 14. Where such an instruction is received, the MG drive computer 18 switches off the system relays SR1 and SR2 and cuts off the supply of power to the inverter 12.

Further, the MG drive computer 18 also executes the discharge control for controlling the drive of the inverter 12 and discharging the electric charges from the smoothing capacitor 14. In the discharge control, the inverter 12 is controlled so as to discharge the electric charges of the smoothing capacitor 14, for example, by allowing a d-axis current to flow to the rotating electric machine 10, in other words, by energizing the coils of the rotating electric machine 10 so that no torque is generated in the rotating electric machine 10. The smoothing capacitor 14 can thus be rapidly discharged by active consumption of power.

However, the problem associated with such discharge control, is that a back electromotive force is generated and the discharge becomes impossible or requires a significant time if the rotating electric machine 10 rotates. In particular, when a drive shaft comes out as a result of vehicle collision or when the vehicle turns over, the rotating electric machine 10 often continues rotating at a high speed thereby even if the vehicle stops.

Accordingly, in the present embodiment, the revolution speed reduction control for reducing the revolution speed of the rotating electric machine 10 is also performed prior to the discharge control. In the revolution speed reduction control, the first control or second control is executed according to the revolution speed of the rotating electric machine 10.

In the second control, the switching elements of the upper arm connected to the high-voltage side (plus terminal side) or the switching elements of the lower arm connected to the low-voltage side (minus terminal side), from among the switching elements Q1 to Q6 of the inverter 12, are switched on for all of the three phases. In the case of the second control, all of the three phases of the upper arm are on and all of the three phases of the lower arm are off, or all of the three phases of the lower arm are on and all of the three phases of the upper arm are off.

Further, in the first control, a switching element of the upper arm connected to the high-voltage side (plus terminal side) or a switching element of the lower arm connected to the low-voltage side (minus terminal side), from among the switching elements Q1 to Q6 of the inverter 12, is switched on for only one phase. Therefore, in the case of the first control, one phase of the upper arm is on and the other two phases of the upper arm and all of the three phases of the lower arm are off, or one phase of the lower arm is on and the other two phases of the lower arm and all of the three phases of the upper arm are off.

When the first control and second control are performed, a resistance to rotation that accompanies the rotation, that is, the so-called "drag torque", occurs in the rotating electric machine 10. In the present embodiment, the revolution speed of the rotating electric machine 10 is rapidly reduced and a rapid discharge is thereby enabled by actively generating the drag torque.

Figure 2:
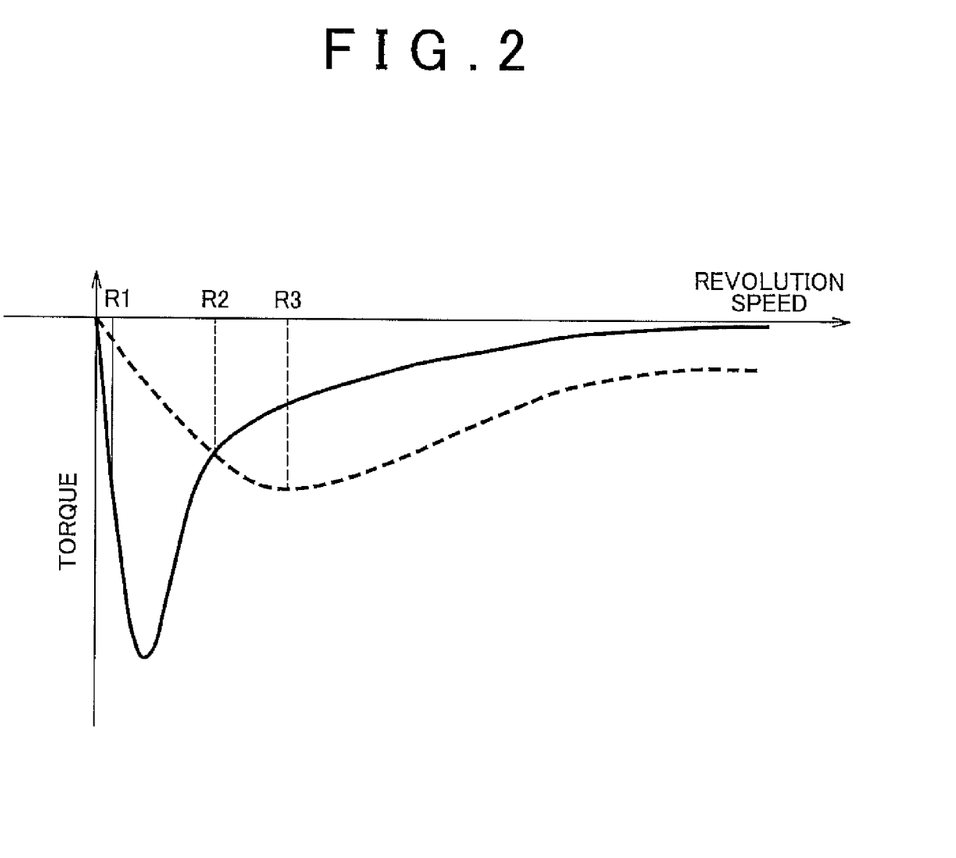
FIG. 2 illustrates the relationship between a drag torque and a revolution speed.

The drag torque varies according to the revolution speed. FIG. 2 is a graph illustrating the relationship between a revolution speed and a drag torque occurring when the first control and second control are performed. In FIG. 2, the solid line indicates the drag torque occurring during the second control and a broken line indicates the drag torque occurring during the first control. The drag torque is represented by a negative value to distinguish it from the torque occurring during the power running control of the rotating electric machine 10.

As follows from FIG. 2, the drag torque occurring during the second control rapidly increases at the revolution speed R1 to R2, which is a low-revolution-speed region, then rapidly decreases, and continuously decreases gradually after the revolution speed R2. Therefore, the drag torque in the second control assumes a comparatively high value at a revolution speed R1 to R2, which is a low-revolution-speed region, and assumes a comparatively low value after the revolution speed R2.

Meanwhile, the drag torque in the first control increases gradually till the revolution speed R3 (R3>R2), which is a comparatively high revolution speed, is reached, assumes a maximum value at revolution speed R3, and then decreases gradually.

Where the drag torques during the first control and second control are compared, in the low-revolution-speed region before the revolution speed R2 is reached, the drag torque during the second control is higher, but in a high-revolution-speed region after the revolution speed R2, the drag torque during the first control is higher. In the present embodiment, the attention is paid to such a relationship between the drag torque and revolution speed and the control at which a higher drag torque is obtained is executed.

More specifically, in the present embodiment, the revolution speed at which the revolution of the rotating electric machine 10 essentially can be considered equal to zero, in other words, the revolution speed R1 at which the back electromotive force occurring during the rotation is small and the discharge induced by the switching control can be performed within the predetermined time, is set as the first threshold. The revolution speed R2 at which the relationship between the drag torque during the first control and the drag torque during the second control is reversed is set as the second threshold. Where the revolution speed reduction control of the rotating electric machine 10 is necessary to discharge the smoothing capacitor 14, first, the revolution speed of the rotating electric machine 10 is acquired. Where the obtained revolution speed is greater than the second threshold R2, the first control is performed, and where the obtained revolution speed is equal to or less than the second threshold R2, the second control is performed. Where the revolution speed of the rotating electric machine 10 is equal to or less than the first threshold R1, the discharge control of the smoothing capacitor 14 is performed, that is, the switching control of the inverter 12 is performed to energize the coil of the rotating electric machine 10 so as to prevent the generation of torque. With such a configuration, the revolution speed of the rotating electric machine 10 can be reduced more rapidly and the discharge control can be started more rapidly after the vehicle collision has occurred. As a result, the time period from the occurrence of vehicle collision to the end of discharge can be shortened.

Figure 3:
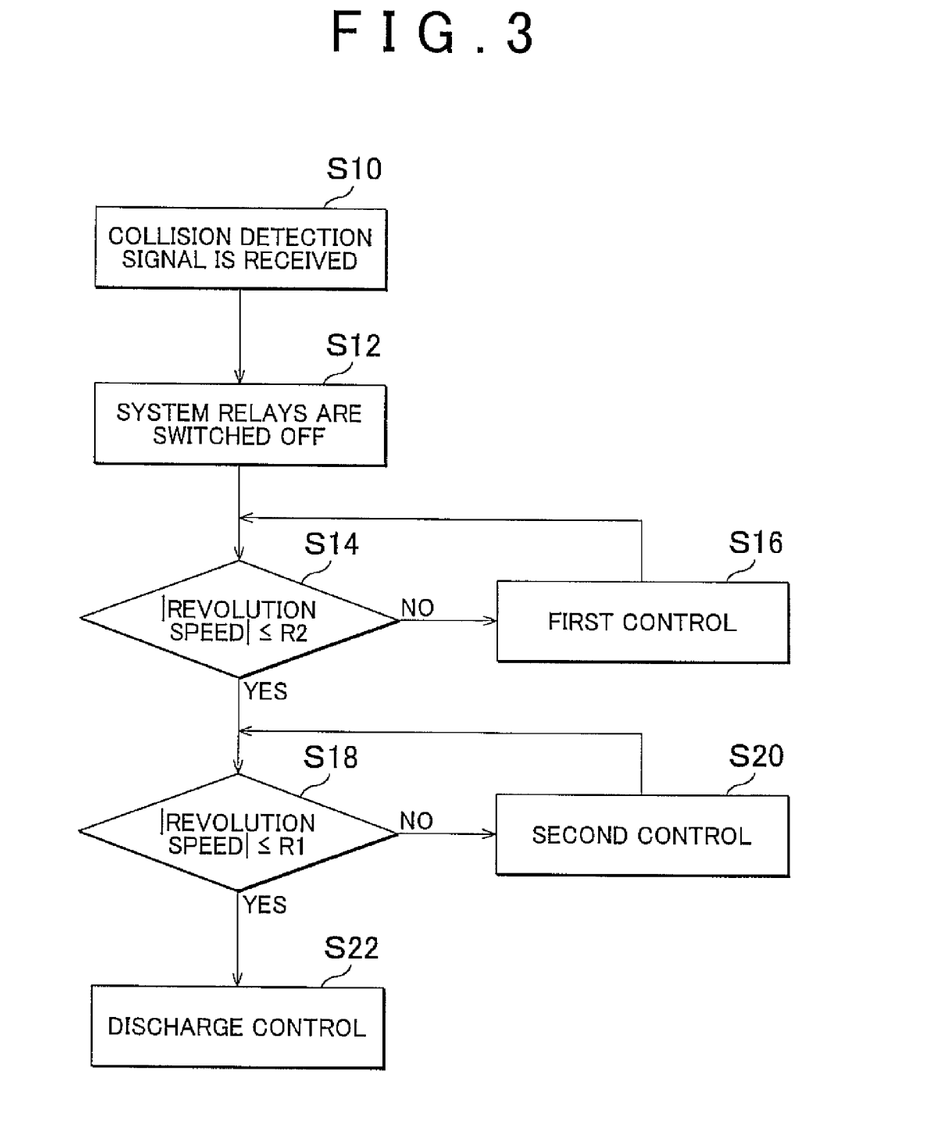
FIG. 3 is a flowchart illustrating the flow of control performed after a collision has been detected.

The discharge processing performed in the event of collision in the present embodiment is explained below with reference to FIG. 3. FIG. 3 is a flowchart illustrating the flow of processing from the detection of collision to the end of discharge in the present embodiment. As shown in FIG. 3, where the HV-ECU 20 receives a collision detection signal (S10), the HV-ECU 20 instructs the MG drive computer 18 to execute the control corresponding to the collision. The MG drive computer 18 that has received the instruction switches off the system relays SR1 and SR2 and cuts off the supply of power to the inverter 12 (S12).

The revolution speed of the rotating electric machine 10 is then checked and it is determined whether or not the revolution speed is equal to or less than the second threshold R2 (S14). In the case where the revolution speed is determined to exceed the second threshold R2, the first control is executed in which only a switching element of one phase of the upper arm or one phase of the lower arm, from among the switching elements of the inverter 12, is switched on and all other switching elements are switched off (S16).

Meanwhile, where the revolution speed is determined to be equal to or less than the second threshold R2, it is then determined whether or not the revolution speed is equal to or less than the first threshold R1 (S18). In the case where the revolution speed is determined to exceed the first threshold R1, the second control is executed in which only the switching elements of the three phases of the upper arm or of the three phases of the lower arm, from among the switching elements of the inverter 12, are switched on and all other switching elements are switched off (S20).

When the revolution speed is equal to or less than the first threshold R1, the switching control of the inverter 12 is performed and the discharge control for discharging the smoothing capacitor 14 is performed so that a d-axis current flows in the rotating electric machine 10, in order words, so as to energize the coil of the rotating electric machine 10 in order to prevent the occurrence of torque in the rotating electric machine 10 (S22).

When the first control and second control are preformed, the revolution speed of the rotating electric machine 10 is checked periodically, that is, the processing flow periodically returns to step S14 or step S18, and the control corresponding to the obtained revolution speed is executed.

Figure 4:
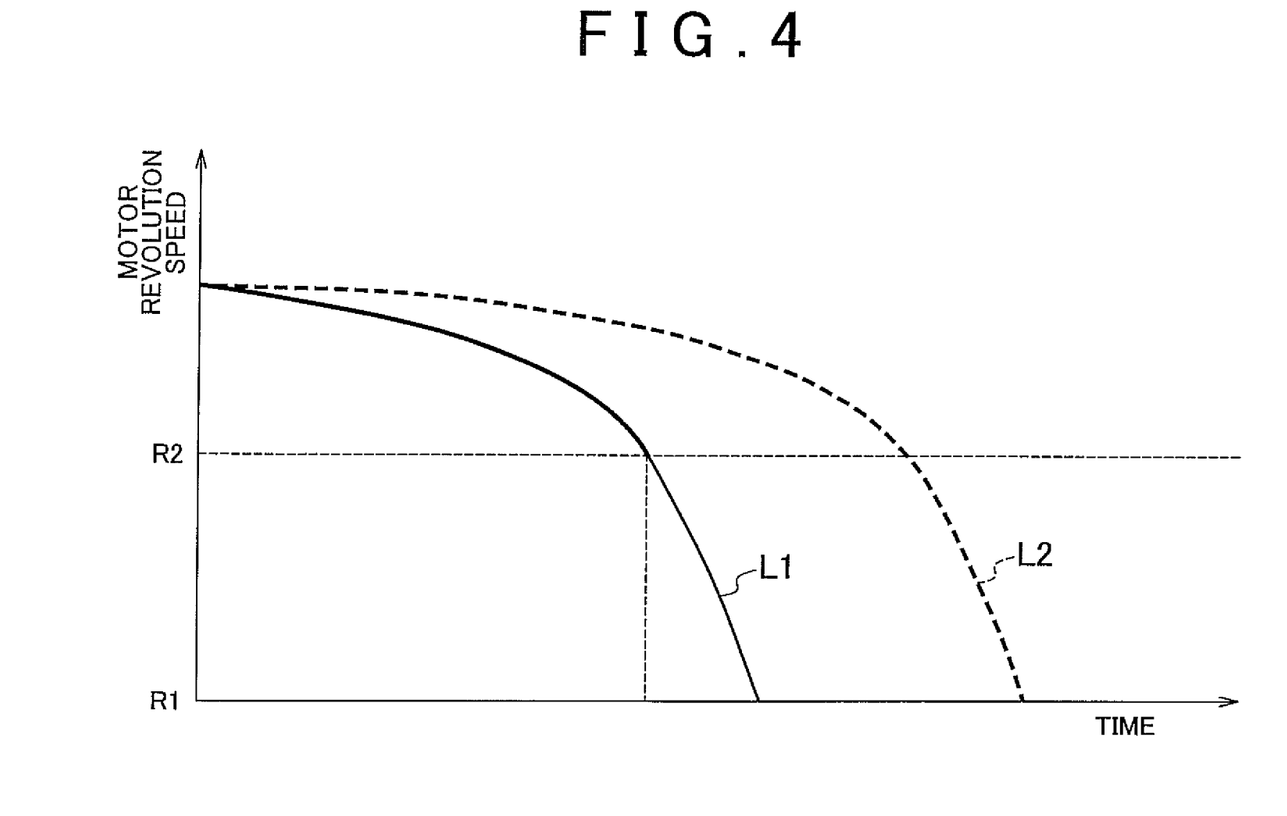
FIG. 4 illustrates how the revolution speed changes in the present embodiment and in the case where only the second control is performed.

As clearly follows from the explanation above, in the present embodiment, the revolution speed reduction control for reducing the revolution speed of the rotating electric machine 10 is performed prior to the discharge control. The effect demonstrated by such a feature is explained below in comparison with the case in which only the second control is executed to reduce the revolution speed. FIG. 4 is a graph illustrating variations in the revolution speed of the rotating electric machine 10 after the revolution speed reduction control has been started. In FIG. 4, a solid line L1 illustrates variations in the revolution speed in the present embodiment, and a broken line L2 illustrates variations in the revolution speed in the case where only the second control is performed, without performing the first control. Further, a thick linear portion of the solid line L1 illustrating revolution speed variations in the present embodiment indicates the execution period of the first control and the thin linear portion indicates the execution period of the second control.

When only the second control is used, the second control is executed immediately after a collision has been detected, in other words, even in a region with a comparatively high revolution speed of the rotating electric machine 10. In the second control, the drag torque is small in a high-revolution-speed region and therefore when only the second control is performed, a significant time is required for the revolution speed to reach the second threshold R2, as shown in FIG. 4. After the second threshold R2 has been reached, a high drag torque is obtained. Therefore, the revolution speed decreases rapidly. However, since a time is needed to reach the second threshold R2 after the collision has been detected, the resultant time required to reach the first threshold R1, at which the discharge control is allowed, after the collision has been detected is extended.

Meanwhile, in the present embodiment, the first control is promptly executed after the collision has been detected. In the first control, the drag torque in the high-revolution-speed region is high. Therefore, according to the present embodiment, the revolution speed rapidly decreases immediately after the collision has been detected. Further, where the revolution speed reaches the second threshold R2, the control is switched to the second control in which the drag torque in a low-revolution-speed region is high. As a result, after the revolution speed has reached the second threshold R2, the revolution speed decreases more abruptly and rapidly reaches the first threshold R1.

In other words, by switching the first control and second control according to the revolution speed as in the present embodiment, it is possible to complete the discharge more rapidly than in the case where only the second control is used.

Further, as in the present embodiment, by generating the drag torque as the first control or second control upon collision, it is possible to reduce the inertia run of the vehicle after the collision and stop the vehicle more safely.

Further, in the present embodiment, the revolution speed R2 corresponding to the reverse of the magnitude relationship between the drag torque generated during the first control and the drag torque generated during the second control is set as the second threshold. However, it is not necessary that the revolution speed R2 be exactly equal to the second threshold and a certain error may be present. In such a case, however, it is still desirable that the second threshold be higher than the revolution speed R2.

The invention claimed is:

1. A drive system for a rotating electric machine that functions as a running drive source for a vehicle, comprising:
a collision detection unit that detects a collision or a possibility of collision of the vehicle;
an inverter that converts direct current power supplied from a direct current supply into alternating current power and outputs the alternating current power to the rotating electric machine;
a smoothing capacitor that smoothes a voltage between terminals of the inverter; and
a controller that performs a discharge control for controlling the inverter, wherein
when the collision or possibility of collision is detected, the controller cuts off a power output from the direct current supply, performs a revolution speed reduction control for reducing a revolution speed of the rotating electric machine to a value equal to or less than a predetermined first threshold, and then discharges electric charges accumulated in the smoothing capacitor, and wherein
the controller performs a first control for switching on a switching element of one arm among an upper arm and a lower arm of the inverter for only one phase and switching off all other switching elements when the revolution speed of the rotating electric machine exceeds a second threshold that is higher than the first threshold in the revolution speed reduction control.

2. The drive system for a rotating electric machine according to claim 1, wherein the controller performs a second control for switching off the switching elements of one arm among the upper arm and the lower arm of the inverter for all of three phases and switching on the switching elements of the other arm for all of the three phases when the revolution speed of the rotating electric machine is equal to or lower than the second threshold and higher than the first threshold in the revolution speed reduction control.

3. The drive system for a rotating electric machine according to claim 1, wherein the second threshold is a revolution speed at which a drag torque generated by the first control is equal to a drag torque generated by the second control.

4. The drive system for a rotating electric machine according to claim 1, wherein the second threshold is a revolution speed at which a drag torque generated by the first control is greater than a drag torque generated by the second control.

* * * * *